Patented Dec. 19, 1944

2,365,604

UNITED STATES PATENT OFFICE 2,365,604

STORAGE BATTERY PLATES AND PROCESS FOR MAKING THE SAME

Alexander Stewart, Mountain Lakes, N. J., and Eugene Willihnganz, Baldwin, N. Y., assignors to National Lead Company, New York, N. Y., a corporation of New Jersey No Drawing. Application December 19, 1940, Serial No. 370,802

12 Claims. (Cl. 136—27)

This invention relates to an improved active material for the plates of storage batteries of the lead-acid type. More particularly it relates to the incorporation of a particular organic material, namely hydrolyzed wood, into the active material of the battery plates. It has for one of its objects the improvement of capacity of batteries of the lead-acid type.

It has been recognized that the performance of a battery at low temperatures and high discharge rates is considerably improved if certain substances commonly called "expanders" are incorporated into the negative plate together with the litharge. A number of substances have been proposed for this purpose, among which are barium sulfate, lampblack, and various organic substances. The present state of the art recognizes among the organic expanders, the organic lignin type of material, or humic acid material, as the most successful, whether it be combined with other inorganic materials or not. Usually about ¼ to 2% or organic substance is added to the litharge for the negative plate and such organic substances are usually derived from woody or vegetable fibre sources, or peat or humic acid containing materials.

Ordinary wood flour was first used but certain harmful substances which affect the battery adversely were found to dissolve in the battery electrolyte. It has been our experience that the negative plate so produced is very little better than one without organic expanders, and is not nearly as good as one produced by more modern methods. These modern methods involve the preparation of various ligneous substances such as lignin, humin, humic acid, hymatomelanic acid, crenic acid, apocrenic acid, ulmin or ulmic acid. It is believed that these substances are closely related chemically and are ultimately derived from a constituent of the cell wall of woody fibers, which constituent has also been termed lignin.

We are aware that various methods of separating this ligneous constituent from the wood products have been proposed in the prior art, such as treating wood, and the like, with strong acids, alkalies or acids in the presence of a large amount of an expensive organic solvent such as alcohol glycol phenol or glycerin. In each of these cases the ligneous constituent suffers considerable alteration in the process of separation so that the final product is distinctly different from the substance occurring naturally in the wood. In addition the process using an organic solvent is long and relatively expensive, and hence produces a product which would be impractical to use in storage batteries.

In addition, various starting materials result in different end products. For example, broad leaf woods give a different lignin than coniferous wood; lignins from corncobs, bark, leaves, etc. are all supposed to be different from wood lignins and if these substances are allowed to decay, or ferment under aerobic conditions, additional changes are produced.

In general, we feel that the terms which have been used to designate the various ligneous substances have no precise meaning unless the starting material and separation process are clearly described. Many such processes have been disclosed, among which may be mentioned the following:

The treatment of woody substances with 72% sulfuric acid which treatment gives a lignin which is highly polymerized, is only slightly soluble in alkali, and does not react with sodium bisulfite;

The treatment of woody substances with hot 42% sulfuric acid which process yields a partly charred carbohydrate whose activity is probably partly due to the lignin derivative formed.

However, these ligneous products were found to be not wholly satisfactory because of the drastic conditions under which the wood was treated. Hence, a further improvement was made in the art by the discovery that lignin could be extracted by organic alcohols in the presence of a small amount of acid. This process did not char or polymerize the lignin as in previous processes and gave a product which was still more effective in the battery. The process, however, has not found general acceptance because of the high cost of preparing lignin by this method and the poor yields obtained. In addition, it is believed that the alcohol used as a solvent combines chemically with the lignin to give a product whose activity is not so good as is possible to obtain.

Still another process described by the prior art involves the use of tanbark, straw, sawdust, leaves, cornstalk as starting materials. These are first subjected to aerobic decomposition, then are treated with water containing a small amount of mineral acid, and are then extracted with alcohol which removes the active substance.

We have now found that it is possible to secure an extremely active expander by treating a fibrous vegetable substance such as wood flour, cocoanut hulls, peat moss, tan bark, straw or cereal hulls, leaves, bagassee, and the like, referred to in the appended claims as "natural lignocellulose," with water, alone or in combination with dilute acid and using the insoluble residue thereof.

Such a product which we have designated as hydrolyzed wood differs from products previously used in storage batteries in that it has not been obtained by treatment with a strong acid or alkali and hence the active substance has not been charred, polymerized, resinified or otherwise chemically altered to a point where its usefulness in a battery has been reduced. In addition, it is the product of a simple process without expensive reagents.

The hydrolyzed wood which according to the present invention is incorporated into the negative plate oxide may be prepared by mixing 10 parts of wood flour with 100 parts of water and one part of sulfuric acid and heating the mixture in a closed vessel at a temperature between about 130° and 200° C. for a period of from about 15 minutes to 2 hours, during which time an appreciable portion of the solid matter is dissolved. The mixture is then cooled to a temperature of less than 100° C. and the insoluble active substance filtered off. The insoluble material is then washed free of acid with water and dried. It is to be observed that the higher the temperature employed the shorter will be the time necessary for carrying out the reaction. Thus, if a temperature of the order of 200° C. is used it will require a period of about 15 minutes to complete the reaction, whereas if a temperature of about 130° C. is used a longer period of time, about 2 hours, will be needed to carry out the reaction.

Another method of obtaining the desired product is to carry on the reaction in the absence of any added acid. Thus, 10 parts of wood flour may be mixed with 100 parts of water and heated to a temperature of between about 200° C. to 285° C. for a period of from about 5 minutes to one hour, the longer periods of time being required where lower temperatures are employed. The mixture is then cooled and the insoluble material filtered off, washed with water and dried.

The exact conditions for obtaining the hydrolyzed wood will vary depending upon the nature of material to be treated, the temperature employed, the amount of acid, if any, used and the period of time within which the reaction is to be carried out.

Therefore, it is to be understood that the above specific proportions and materials used in preparing these expanders are by way of illustration only and may be varied within reasonable limits without seriously affecting the results. Thus, we may start with wood of any known species, or we may use any other plant substance containing substantial amounts of lignin. We may treat these substances or a mixture of them with water alone or with water containing up to 10% but preferably between about .5% and about 3% of acid, said percentages being by weight. As an acid we may use any of the common mineral or organic acids, such as sulfuric, nitric, hydrochloric, phosphoric or acetic, generically referred to in the appended claims as "acid cellulose hydrolyzing agents," or we may omit the acid entirely and rely on the action of the water alone.

Any amount of this expander between about 0.10% and about 5% of the weight of the litharge used may be incorporated into the paste of the storage battery plates. Instead of litharge we may use other lead compounds such as finely divided lead, mixtures of finely divided lead with litharge, or litharge containing other compounds of lead.

The dried organic material or hydrolyzed wood obtained in the manner described is now incorporated into the negative plate oxide to form the active material for the negative plate. To illustrate our invention we describe this procedure.

*Example 1*

To 100 pounds of litharge are added a half pound of dried organic material or hydrolyzed wood obtained in a manner described above, one pound of blanc fixe and 4 ounces of lamp black. All of the ingredients are then mixed thoroughly in a mixing machine. This material may now be stored until ready to be used or shipped or it may be immediately mixed into a paste and pasted into the negative grid. Whenever it is ready to be pasted, the mixture is stirred with the usual water and sulfuric acid solution used by those familiar with the art of pasting plates.

It is to be understood that the amounts of materials may be varied within certain limits to suit individual requirements.

Indicative of the advantages of this product in storage batteries, is the fact that we have found that in comparison with batteries prepared with various prior art organic expanders, the product of the present invention gives a battery with a superior performance. We prepared batteries according to recognized methods and gave them successive cycles of charge and discharge according to the specifications of the Society of Automotive Engineers, and then measured the capacity at 0° F. using a discharge rate of 300 amperes. The following table sets forth the comparative results obtained:

|  | No. of discharge | Duration of discharge period |
|---|---|---|
|  |  | *Minutes* |
| No organic expander | 1 | 3.07 |
|  | 50 | 1.73 |
|  | 125 | 1.55 |
|  | 220 | 1.97 |
| 72% acid lignin | 1 | 2.97 |
|  | 50 | 2.03 |
|  | 125 | 1.52 |
|  | 220 | 1.83 |
| Partly carbonized cellulose fiber | 1 | 2.72 |
|  | 50 | 1.88 |
|  | 125 | 2.13 |
|  | 220 | 2.00 |
| Hydrolyzed wood of the present invention | 1 | 3.15 |
|  | 50 | 4.20 |
|  | 125 | 4.75 |
|  | 220 | 3.92 |

We claim:

1. The process of making an expander for storage battery plates of the lead-acid type which comprises mixing finely-divided natural lignocellulose in water containing between about 0.5 per cent and 10.0 per cent of an acid cellulose hydrolyzing agent, heating said mixture under pressure at a temperature between about 130° C. and above 200° C. for from about fifteen minutes to about two hours and recovering the insoluble residual lignocellulose therefrom.

2. The process of making an expander for storage battery plates of the lead-acid type which comprises mixing finely-divided natural lignocellulose in water containing between about 0.5 per cent and 10.0 per cent of an acid cellulose hydrolyzing agent, heating said mixture under pressure at a temperature between about 130° C. and about 200° C. until substantially all the water-soluble portions of the said lignocellulose have been dissolved and recovering the insoluble residual lignocellulose therefrom.

3. The process of making an expander for storage battery plates of the lead-acid type which comprises mixing finely-divided natural lignocellulose in water containing between about 0.5 per cent and 10.0 per cent of a cellulose hydrolyzing agent selected from the group consisting of sulfuric, nitric, hydrochloric, phosphoric and acetic acids, heating said mixture under pressure at a temperature between about 130° C. and about 200° C. until substantially all the water-soluble portions of the said lignocellulose have been dissolved and recovering the insoluble residual lignocellulose therefrom.

4. The process of making an expander for storage battery plates of the lead-acid type which comprises mixing finely-divided natural lignocellulose in water containing from about 0.5 per cent to about 3.0 per cent sulfuric acid, heating said mixture under pressure at a temperature from about 130° C. to about 200° C. for about fifteen minutes to about one hour and recovering the insoluble residual lignocellulose therefrom.

5. An expander for storage battery plates of the lead-acid type comprising finely-divided treated natural lignocellulose, said treated lignocellulose containing substantially all of the natural cellulose and lignin thereof in situ and being substantially free of the water-solubles contained in natural lignocellulose after cooking in water containing between about 0.5 per cent and 10.0 per cent of an acid cellulose hydrolyzing agent under pressure at a temperature between about 130° C. and about 200° C.

6. An expander for storage battery plates of the lead-acid type comprising finely-divided treated natural lignocellulose, said treated lignocellulose containing substantially all of the natural cellulose and lignin thereof in situ and being substantially free of the water-solubles contained in natural lignocellulose after cooking in water containing between about 0.5 per cent and about 10.0 per cent of a cellulose hydrolysis agent selected from the group consisting of sulfuric, nitric, hydrochloric, phosphoric and acetic acids under pressure at a temperature between about 130° C. and about 200° C.

7. An expander for storage battery plates of the lead-acid type comprising a finely-divided treated natural lignocellulose, said treated lignocellulose containing substantially all the natural cellulose and lignin thereof in situ and being substantially free of the water-solubles contained in the natural lignocellulose after cooking in water containing between about 0.5 per cent and about 10.0 per cent sulfuric acid under pressure at a temperature between about 130° C. and about 200° C.

8. Process of making an active material for storage battery plates of the lead-acid type which comprises mixing finely-divided natural lignocellulose in water containing between about 0.5 per cent and 10.0 per cent of an acid cellulose hydrolyzing agent, heating said mixture under pressure at a temperature between about 130° C. and about 200° C. for from about fifteen minutes to about two hours and recovering the insoluble residual lignocellulose therefrom, washing, drying and mixing said residual lignocellulose with storage battery lead compound.

9. Process of making an active material for storage battery plates of the lead-acid type which comprises mixing finely-divided natural lignocellulose in water containing between about 0.5 per cent and 10.0 per cent of a cellulose hydrolyzing agent selected from the group consisting of sulfuric, nitric, hydrochloric, phosphoric and acetic acids, heating said mixture under pressure at a temperature between about 130° C. and about 200° C. until substantially all the water-soluble portions of the said lignocellulose have been dissolved and recovering the insoluble residual lignocellulose therefrom, washing, drying and mixing said residual lignocellulose with storage battery lead compound.

10. Active material for storage battery plates of the lead-acid type which comprises predominantly storage battery lead compounds and a small amount of finely-divided treated natural lignocellulose, said treated lignocellulose containing substantially all of the natural cellulose and lignin thereof in situ and being substantially free of the water-solubles contained in natural lignocellulose after cooking in water containing between about 0.5 per cent and 10.0 per cent of an acid cellulose hydrolyzing agent under pressure at a temperature between about 130° C. and about 200° C.

11. Active material for storage battery plates of the lead-acid type which comprises predominantly storage battery lead compound and a small amount of finely-divided treated natural lignocellulose, said treated lignocellulose containing substantially all of the natural cellulose and lignin thereof in situ and being substantially free of the water-solubles contained in natural lignocellulose after cooking in water containing between about 0.5 per cent and about 10.0 per cent of a cellulose hydrolysis agent selected from the group consisting of sulfuric, nitric, hydrochloric, phosphoric and acetic acids under pressure at a temperature between about 130° C. and about 200° C.

12. Active material for storage battery plates of the lead-acid type which comprises predominantly storage battery lead compound and a small amount of finely-divided treated natural lignocellulose, said treated lignocellulose containing substantially all the natural cellulose and lignin thereof in situ and being substantially free of the water-solubles contained in the natural lignocellulose after cooking in water containing between about 0.5 per cent and about 10.0 per cent sulfuric acid under pressure at a temperature between about 130° C. and about 200° C.

ALEXANDER STEWART.
EUGENE WILLIHNGANZ.